US012780315B2

(12) United States Patent
Hüger et al.

(10) Patent No.: US 12,780,315 B2
(45) Date of Patent: Nov. 3, 2026

(54) METHOD FOR EVALUATING MOVEMENTS OF A VEHICLE, METHOD FOR OPERATING A VEHICLE-GUIDANCE SYSTEM, ELECTRONIC VEHICLE-GUIDANCE SYSTEM, AND A VEHICLE HAVING AN ELECTRONIC VEHICLE-GUIDANCE SYSTEM

(71) Applicant: Volkswagen Aktiengesellschaft, Wolfsburg (DE)

(72) Inventors: Philipp Hüger, Rühen (DE); Markus Radimirsch, Uetze (DE); Christian Jördens, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 130 days.

(21) Appl. No.: 18/872,636

(22) PCT Filed: May 16, 2023

(86) PCT No.: PCT/EP2023/063159
§ 371 (c)(1),
(2) Date: Dec. 6, 2024

(87) PCT Pub. No.: WO2023/237304
PCT Pub. Date: Dec. 14, 2023

(65) Prior Publication Data
US 2026/0249911 A1 Aug. 27, 2026

(30) Foreign Application Priority Data
Jun. 7, 2022 (DE) ..................... 10 2022 205 770.8

(51) Int. Cl.
*B62D 15/02* (2006.01)
*B60W 50/16* (2020.01)

(52) U.S. Cl.
CPC ........... *B62D 15/029* (2013.01); *B60W 50/16* (2013.01)

(58) Field of Classification Search
CPC ............................. B62D 15/029; B60W 50/16
(Continued)

(56) References Cited

U.S. PATENT DOCUMENTS 6,092,619 A * 7/2000 Nishikawa ........... B62D 15/025 180/204
7,950,751 B2 5/2011 Offerle et al. ................ 303/193
(Continued)

FOREIGN PATENT DOCUMENTS

CN 112172820 A 1/2021 ................ B60T 7/22
DE 102017002731 A1 9/2018 ............ B60W 10/20
(Continued)

OTHER PUBLICATIONS

German Office Action, Application No. 102022205770.8, 9 pages.
International Search Report and Written Opinion, Application No. PCT/EP2023/063159, 8 pages.

*Primary Examiner* — Kerri L Mcnally
(74) *Attorney, Agent, or Firm* — Slayden Grubert Beard PLLC

(57) ABSTRACT

The disclosure relates to a method for evaluating movements of a vehicle, comprising: moving the vehicle along a trajectory in a maneuvering operation, wherein the trajectory is traveled by manual actuation of a steering element of the vehicle; detecting positions of the steering element when traveling; comparing the positions with a reference position and determining an exceedance result by means of an evaluation unit, in which a position is greater than or equal to the reference position; determining an assessment result on the basis of the exceedance result, wherein an option for autonomously traveling a trajectory portion is assessed using
(Continued)

the assessment result; and providing the assessment result to a vehicle-guidance system of the vehicle.

20 Claims, 2 Drawing Sheets

(58) Field of Classification Search
USPC .......................................................... 340/439
See application file for complete search history.

(56) References Cited

U.S. PATENT DOCUMENTS

| | | | | |
|---|---|---|---|---|
| 2008/0312792 | A1* | 12/2008 | Dechamp | B60Q 1/48<br>701/41 |
| 2013/0035821 | A1 | 2/2013 | Bonne et al. | 701/25 |
| 2016/0229451 | A1* | 8/2016 | Raad | B62D 15/027 |
| 2016/0378118 | A1 | 12/2016 | Zeng et al. | 701/28 |
| 2017/0174023 | A1 | 6/2017 | Hu et al. | 348/135 |
| 2017/0320433 | A1* | 11/2017 | Zhang | G06V 20/58 |
| 2018/0029429 | A1* | 2/2018 | Janardhana | B60D 1/36 |
| 2019/0161086 | A1* | 5/2019 | Bettger | B62D 15/029 |
| 2020/0033146 | A1* | 1/2020 | Cash | G01C 21/18 |
| 2020/0086702 | A1 | 3/2020 | Ling | |
| 2022/0080970 | A1* | 3/2022 | Günzel | B60W 30/18036 |
| 2022/0402483 | A1* | 12/2022 | Harai | G08G 1/00 |
| 2023/0271647 | A1* | 8/2023 | Mcclung | B62D 15/0235<br>701/33.4 |

FOREIGN PATENT DOCUMENTS

| | | | | |
|---|---|---|---|---|
| DE | 102020206942 | A1 | 12/2021 | B60W 30/06 |
| DE | 102022205770 | A1 | 12/2023 | B60W 10/04 |
| WO | 2021/090610 | A1 | 5/2021 | B60W 30/06 |
| WO | 2023/237304 | A1 | 12/2023 | B62D 15/02 |

* cited by examiner

METHOD FOR EVALUATING MOVEMENTS OF A VEHICLE, METHOD FOR OPERATING A VEHICLE-GUIDANCE SYSTEM, ELECTRONIC VEHICLE-GUIDANCE SYSTEM, AND A VEHICLE HAVING AN ELECTRONIC VEHICLE-GUIDANCE SYSTEM

CROSS-REFERENCE TO RELATED APPLICATIONS

This application claims priority to German Patent Application DE 10 2022 205 770.8, filed on Jun. 7, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior against the present disclosure.

The disclosure relates to a method for evaluating movements of a vehicle.

The disclosure further relates to a method for operating vehicle-guidance system of a vehicle.

The disclosure also relates to an electronic vehicle-guidance system having an evaluation unit and to a vehicle having a corresponding vehicle-guidance system.

For example, vehicles such as passenger cars or trucks comprise a variety of driver assistance systems for supporting a user of the vehicle or else the vehicle driver. There are, for example, already parking assistance systems which assist the driver when they are parking in a parking space, for example. Equally, in this regard, there are also assistance systems by means of which the driver can also be supported or else assisted when subsequently pulling out.

SUMMARY

A need exists to provide an improved vehicle-guidance system, such that an autonomous maneuvering operation can be performed more efficiently.

The need is addressed by the subject matter of the independent claim(s). Embodiments of the invention are described in the dependent claims, the following description, and the drawings.

DESCRIPTION

Figure 1:
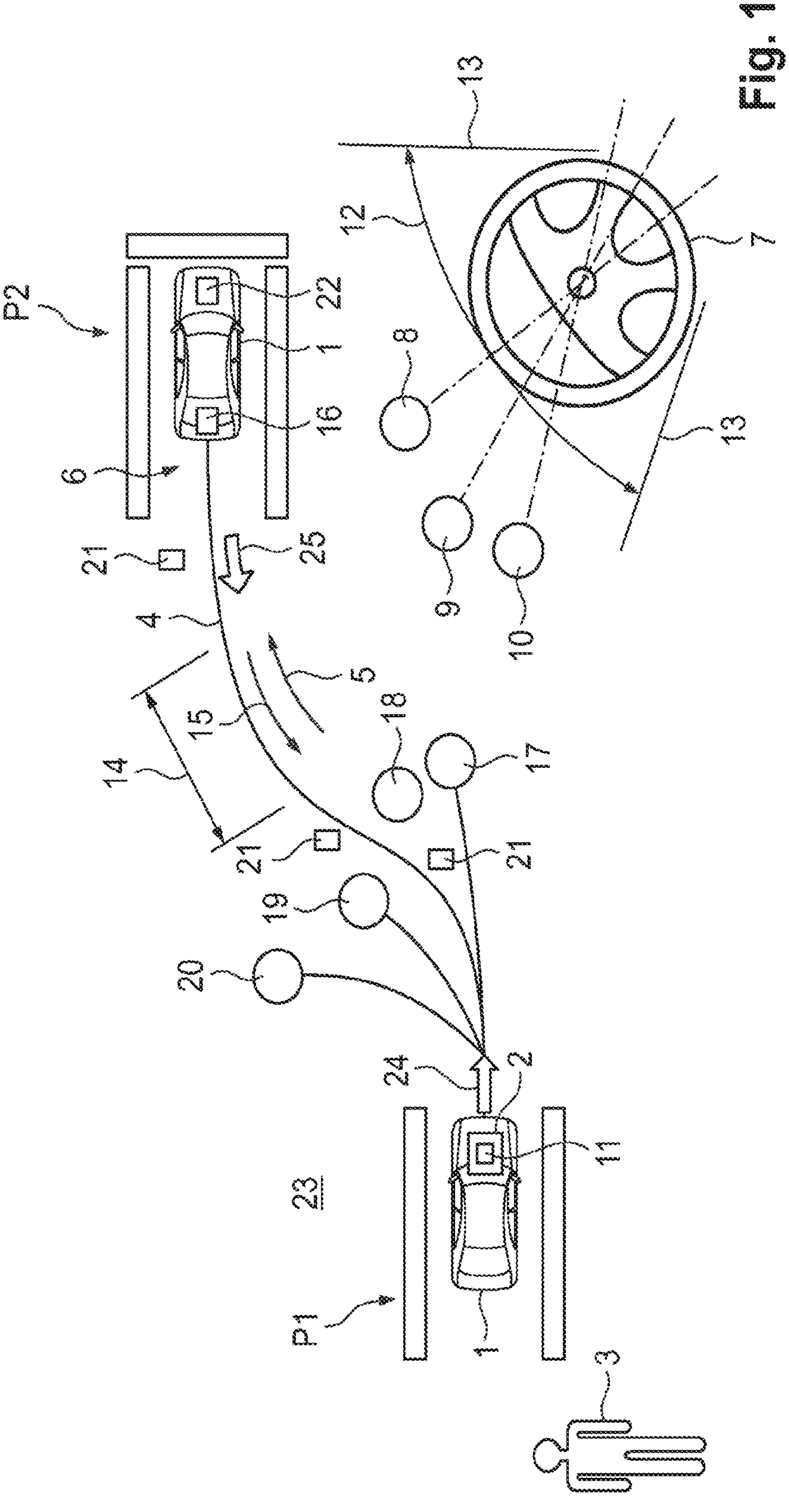
FIG. 1 is a schematic representation of a vehicle comprising an example electronic vehicle-guidance system during travel of a trajectory.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

One example aspect relates to a method for evaluating movements of a vehicle, wherein the following steps are carried out:

- moving the vehicle along a trajectory in a maneuvering operation of the vehicle, wherein the trajectory is traveled by manual actuation of a steering element of the vehicle by a user;
- detecting positions of the steering element when traveling the trajectory;
- comparing the positions with at least one specified reference position of the steering element and determining at least one exceedance result by means of an evaluation unit, in which a position is greater than or equal to the reference position;
- determining an assessment result by means of the evaluation unit at least on the basis of the at least one exceedance result, wherein a potential option for autonomously traveling at least one trajectory portion of the trajectory in a maneuvering direction opposite to the maneuvering direction is assessed using the assessment result;
- providing the assessment result to a vehicle-guidance system of the vehicle.

By means of the proposed method, an electronic vehicle-guidance system for supporting a driver of a vehicle can be improved, for example. This can be realized or else achieved by means of the provided assessment result. By means of the assessment result, in which the at least one exceedance result was taken into account, a dangerous autonomous driving maneuver can be prevented in the event of a closed-loop control limit for the vehicle-guidance system being exceeded. If, for example, it is established during determination or else generation of the assessment result that autonomously traveling at least the trajectory portion in the maneuvering direction opposite to the maneuvering direction cannot be performed by the vehicle-guidance system without posing a danger, this can be taken into account by the vehicle-guidance system. Accordingly, the driver or rather user of the vehicle can be made aware that autonomous travel is currently or else temporarily not possible. Thus, a particular approach can be used to prevent the at least one trajectory portion from being autonomously traveled and thus, for example, to prevent other road users in the surroundings from being endangered. For example, this makes it possible to prevent positions of the steering element or else of a steering wheel that constitute system-side limit of the vehicle-guidance system from being set or else used when the trajectory is traveled manually by the user. Therefore, in particular during the assessment or else during determination of the assessment result, it can be ensured that states do not exceed the closed-loop control limit of the vehicle-guidance system when the trajectory is traveled manually. If, for example, marginal positions of the steering element have already been adopted during the manual travel, it may be the case that said positions cannot be reached during the autonomous travel by means of the vehicle-guidance system for reasons relating to closed-loop control quality, a system-side limit range, or due to other electronic or else digital reasons. This can be provided with the assessment result, for example.

Therefore, using the proposed method and, in particular, the assessment result, it is possible to establish on the system side whether autonomous travel at least of the trajectory portion of the trajectory can be performed or not.

For example, the assessment result may be performed for machine training of the vehicle-guidance system with regard to a potential option for autonomously traveling a specific trajectory.

For example, the vehicle-guidance system is an electronic assistance system of the vehicle. Specifically, the vehicle-guidance system may be a “reversing assistant” or else reversing assistant system. In the case of a reversing assistant system of this kind, the driver of the vehicle firstly, for example during forward travel, follows a trajectory that said driver can follow afterwards in reverse assisted by the system. Here, the driver or else user can steer up to the mechanical end stop with regard to the steering of the vehicle during forward travel. The challenge here is that, during closed-loop control along the trajectory, the mechanical end stop of the steering element constitutes a closed-loop control limit for the electronic vehicle-guidance system beyond which no corrections are possible. This imposes a technical limit for the closed-loop control quality, because the steering movements previously taught by the driver cannot be corrected or can only partially be corrected by the system in the event of subsequent reverse travel if the vehicle is not traveling precisely on the trajectory previously followed in the forward direction. As a result, reverse travel deviates from the previously trained trajectory. This may, for example, result in collisions with objects. This can be improved and, in particular, optimized by means of the proposed method. Therefore, associated disadvantages can be resolved by means of the proposed method.

In particular, the movement of the vehicle along the trajectory or else a route portion or else a route or else a travel route takes place manually by the user or else driver of the vehicle.

The trajectory may thus be a movement path during the travel or else during the maneuvering operation. The maneuvering operation may, for example, be a parking operation, a parking-in operation, a pulling-out operation, travel through a narrow passage, or slow driving. In particular, the maneuvering operation takes place at a speed of at most 10 km/h, in particular 15 km/h, especially at most 30 km/h. In particular, the maneuvering operation may take place at walking speed.

The steering element of the vehicle is, for example, a steering wheel or else steering handle. Therefore, the user can steer or else control the vehicle with the aid of the steering element. During travel of the trajectory, the positions of the steering element can be detected or else recorded, in particular continuously or else permanently. This may take place, for example, by means of a detection unit of the vehicle or else of the vehicle-guidance system. For example, the positions of the steering element may be different steering lock angles, steering angles, or steering locks. In particular, the positions of the steering element are a relevant steering wheel position.

With the aid of the evaluation unit, which is designed, for example, as an electronic evaluation unit, the positions can be compared or else analyzed or else evaluated based on at least one specified reference position. The specified reference position or else an item of reference information can be made available in advance on the system side by the evaluation unit. A system-side closed-loop control limit or else technical limit or else closed-loop control quality of the vehicle-guidance system can be taken into account based on the specified reference position. In the process, it is in particular checked or else established which critical positions or else critical values a position should have as a maximum. If the position exceeds or else surpasses this, an exceedance result applies. The exceedance result should be understood to mean that a position of the steering element exceeds the specified reference position and thus adopts a critical state or else critical position. This, in turn, would pose problems or else hazards for the vehicle-guidance system for the autonomous travel. In a worst case scenario, the autonomous travel with the aid of the vehicle-guidance system would no longer be available. For example, the reference positions may be specified steering lock thresholds or else steering lock angles for the steering element. For example, specified, in particular maximum, steering angles can be specified based on the reference position, which steering angles should not be reached for system-related reasons during manual travel of the trajectory, for example by the user with the aid of the steering element. If, for example, the user uses the steering element to set a steering angle or else steering wheel angle that surpasses the reference position, an exceedance result applies here. This can, in particular, be established automatically with the aid of the evaluation unit. The assessment can then be done in consideration of the exceedance result, such that it is possible to establish, depending on a period of time and/or item of information relating to the exceedance result, whether a potential option for autonomously traveling at least the trajectory portion can be performed or not for safety- and system-related reasons. This can be provided or else transmitted to the vehicle-guidance system, for example from the evaluation unit via communication technology connections.

The trajectory portion is, for example, a route portion or else movement path portion of the trajectory. If, for example, the maneuvering direction is a forward parking direction into a parking space, the opposite maneuvering direction should be understood to be a reverse parking direction. For example, manual parking of the user into a parking space can thus be performed in the maneuvering direction. In the event of possible autonomous travel in the opposite maneuvering direction, the parked vehicle can pull out autonomously.

In particular, potential autonomous travel of the at least one trajectory portion may take place temporally following on from the travel of the trajectory. Thus, the autonomous travel of the trajectory in the maneuvering direction opposite to the maneuvering direction takes place temporally following on from or else temporally later than the maneuvering operation.

In particular, the positions may be compared and, above all, the assessment result may be determined continuously as early as during the maneuvering operation. It is also conceivable for this to take place after the maneuvering operation has been performed. However, it is for example for the positions to be continuously detected and compared with the reference position during manual travel of the trajectory, such that an assessment can be performed in the event of an exceedance result continuously and, in particular, during the maneuvering operation at a relevant point in time, such that the user can make changes or else adjustments to their driving behavior or else their maneuvering behavior as early as during manual actuation of the steering element, for example.

In some embodiments, it is provided that at least one alert is generated depending on the provided assessment result, wherein the at least one alert is output acoustically, optically, and/or haptically in the vehicle. As result, the user can be notified, for example during the maneuvering operation or immediately after the maneuvering operation, that, for example, autonomous travel by means of the vehicle-guidance system is not possible or that this is only possible at least to a limited extent. For example, the alert can be used to output that, for example, a reversing function of the vehicle-guidance system is only partially available or only available to a limited extent. In a worst case scenario, an alert can be output to the user that autonomous travel with the aid of the vehicle-guidance system is not possible and thus is not available.

For example, the at least one alert or multiple alerts can be output acoustically, optically, and/or haptically to the user via an output unit in the vehicle and/or an output unit of a mobile terminal of the user. For example, haptic feedback with regard to the steering element can be output to the user depending on the alert. Therefore, the user can be informed of the assessment result and thus of the exceedance result by means of a vibration of the steering element.

In some embodiments, it is provided that further alerts are generated in addition to the at least one alert depending on a value of the exceedance result, wherein the at least one alert and the further alerts are output in a cascaded sequence in the vehicle. For example, advance warnings can be output as soon as it is established that critical and, in particular, system-critical states are occurring during the maneuvering operation at least in the event of an exceedance result. For example, if it is established that a position at least approaches or is at least the same as the reference position, an advance warning for the user can already be output during travel of the trajectory. Thus, countermeasures or else counter-steering measures can already be implemented in this case beforehand or else at an early stage. Depending on the magnitude of the exceedance result and, in particular, depending on the difference between the positions and the reference position, cascaded alerts or else warnings can be output to the user. Thus, countermeasures can be implemented at an early stage in order to allow for potential autonomous travel.

In particular, the alerts can be output in a specified cascaded sequence, such that, firstly, a milder or else gentler warning is output, until at a later point in time a strong, particular intense, warning is output to the user.

In some embodiments, it is provided that a recommendation for action is output to the user with the at least one alert, which recommendation for action proposes adjusting or else correcting the manual actuation of the steering element to the user. Here, an actuation with a view to changing the position of the steering element to less than or equal to the reference position can be proposed. Therefore, with the aid of the recommendation for action, during the manual travel of the trajectory during the maneuvering operation, the user is instructed such that autonomous travel can later be performed by the vehicle-guidance system. Therefore, with the aid of the recommendation for action, the user can adjust or else adapt the manual actuation of the steering element and, in particular, the manual driving of the vehicle during the maneuvering operation along the trajectory. Therefore, it can, for example, be acoustically signaled to the user that, for example, a steering angle or else steering lock angle of the steering element must be corrected or adjusted in order not to impair or else prevent a system limit or else closed-loop control limit of the vehicle-guidance system for later autonomous, at least semi-autonomous, travel. Therefore, the recommendation for action can already be output during travel of the maneuvering operation. Above all, it can be output or else made available to the user the extent to which said user must change a, for example current, position of the steering element such that, for example, the reference position is not reached or else surpassed. Therefore, it can, for example, be indicated to the user that they must steer or else turn the steering element further to the left or further to the right. Therefore, the steering wheel angle that should be manually set or else maintained by the user can be specified.

For example, a range within which the user should maintain the positions of the steering element can be specified or else provided to the user.

In particular, a relevant actuation of the steering element in multiple directions can be taken into account with the positions. In particular, this should be understood to mean that, for example, the steering element can be turned either to the left or to the right. Therefore, a position can be understood to mean a maximum position to the left and a maximum position to the right.

In some embodiments, it is provided that a steering property of the steering element is adjusted for the manual actuation of the steering element depending on the at least one exceedance result, as a result of which the user experiences haptic feedback in relation to the at least one exceedance result during manual actuation of the steering element. For example, it is possible to specify here the extent to which the user can move or else actuate the steering element into the range of a relevant maximum position, i.e., in a maximum position of the steering wheel to the left or right. Therefore, in particular with the aid of the steering property of the steering element, it is possible to establish, for example, an angular range or else steering lock range with which the user can or else is allowed to actuate or else set the steering element. If, during manual actuation of the steering element, the user brings the steering element into a position in which an exceedance result would apply, haptic feedback, i.e., for example, vibration of the steering element or else steering wheel, can be used to inform the user that they are now in a critical position or else critical actuation of the steering element. Therefore, the user can carry out interventions or else actuation interventions in the driving behavior of the vehicle during the maneuvering operation.

In some embodiments, it is provided that the reference position is determined or else influenced depending on at least one system property of the vehicle-guidance system, wherein the reference position is determined such that it is in a range between a mechanical limit position of the steering element with regard to a manual actuation of the steering element and a system-side limit position with regard to an autonomous actuation of the steering element by the vehicle-guidance system. It is therefore possible for the vehicle-guidance system to perform autonomous travel when the positions of the actuation element are maintained during manual travel of the trajectory with respect to the reference position. In particular, system properties of the vehicle-guidance system, for example closed-loop control behavior, closed-loop control quality, closed-loop control limits, computing powers, or other electronic or else electromechanical properties, can be taken into account. Therefore, the reference position can be determined or else created or else established, for example, by means of the evaluation unit or by means of an apparatus external to the vehicle. Here, a range is established which lies between the mechanical limit position of the steering element with regard to manual actuation of the steering element and the system-side limit position or else an autonomous actuation of the steering element by the vehicle-guidance system. This may, for example, be an interval range. The mechanical limit position is a limit of the steering element that can be reached by means of manual actuation. The system-side limit position is, in turn, a position or else, for example, a steering angle that can be set autonomously by the vehicle-guidance system with the aid of the steering element. The established range therefore makes it possible to prevent a position which cannot be realized or else adopted by the vehicle-guidance system.

In some embodiments, it is provided that a relevant difference between the detected positions and the system-side limit position ascertained, wherein the relevant difference is taken into account when determining the assessment result. Therefore, the positions of the steering element manually actuated or else set by the user can be compared or else assessed with the system-side limit position of the steering element. Here, a difference, in particular a deviation or else comparison result, between the detected positions and the system-side limit position can be ascertained. This can take place, for example, by means of the evaluation unit. If, for example, at least one position has a difference with respect to the system-side limit position that exceeds a specified difference limit value range, it can be established during determination of the assessment result that, for example, autonomous travel is not possible. In particular, it is then critical if a relevant difference is minimal. In particular, the positions should be at a sufficiently large distance with respect to the limit position or else should have a sufficiently large difference from each other. If the detected positions surpass the system limit positions, i.e., the positions are greater than or equal to the system-side limit position, this is not conducive to autonomous travel with the aid of the vehicle-guidance system, and therefore this is, in particular, not possible. The ascertained differences can, for example, be provided to the vehicle-guidance system by the evaluation unit. The respective differences can also be taken into account as early as for the output of the alerts.

In some embodiments, it is provided that, if the difference exceeds a first specified threshold value, a first safety mechanism of the vehicle-guidance system, in which autonomous travel of the at least one trajectory portion of the trajectory in the maneuvering direction opposite to the maneuvering direction can be performed to a limited extent, is activated, and if the difference exceeds a second specified threshold value, a second safety mechanism of the vehicle-guidance system, in which autonomous travel of the at least one trajectory portion of the trajectory in the maneuvering direction opposite to the maneuvering direction cannot be performed, is activated. Therefore, on the system side, the vehicle-guidance system itself, to which the ascertained differences are transmitted, can independently and, in particular, automatically establish the extent to which, for example, autonomous travel can be performed. In particular, further safety mechanisms may also be provided in addition to the first and second safety mechanism. A corresponding safety mechanism can be activated depending on which threshold value the difference exceeds or which threshold value the difference approaches. During the first safety mechanism, autonomous travel may, for example, be offered to the user, however it may be made clear to the user here that this would be performed with a given safety risk. In particular, autonomous travel is only partially possible, in particular only possible to a limited extent, during the first safety mechanism.

Furthermore, a further safety mechanism, for example, may be specified, in which, for example, only semi-autonomous travel is possible and the user must take over certain driving tasks. Therefore, for example depending on the ascertained difference, it can be established by the vehicle-guidance system whether autonomous travel can, in principle, be performed by the vehicle-guidance system or whether, for example, only semi-autonomous driving or else travel is possible. It is also conceivable for the user to only be assisted or else supported with the aid of the vehicle-guidance system and depending on which possible safety mechanism has been activated. Therefore, it is possible to distinguish between autonomous travel and semi-autonomous travel on the system side. The respectively activated safety mechanism can be output to the user of the vehicle acoustically and/or optically, such that the user is informed thereof.

In some embodiments, it is provided that, if at least one of the detected positions corresponds to or exceeds the system-side limit position, the detection of the positions of the steering element during travel of the trajectory and/or detection of the trajectory during travel of the trajectory is aborted. As a result, it is possible to decide on the system side whether autonomous travel is possible in principle as early as during travel of the trajectory, i.e., during manual travel of the trajectory. If this is not the case, no positions of the steering element are detected and/or the trajectory itself is not detected, for example for safety reasons, since this information is no longer relevant to the maneuvering operation currently being performed, since the user must in turn manually perform the subsequent reverse maneuvering operation in relation to the previously performed manual maneuvering operation, since the vehicle-guidance system has reached its system limits and is not available for autonomous travel, i.e., at least for the one subsequent reverse maneuvering operation. This is, for example, a "worst case" safety measure of the vehicle-guidance system, and therefore no dangerous or else traffic-critical autonomous journeys can occur. Therefore, autonomous travel of the vehicle-guidance system is only possible if it is established on the system side that autonomous travel can be performed without any dangers on the system side.

Therefore, the detected positions can be continuously compared or else evaluated with the system-side limit position as early as during travel of the trajectory during the maneuvering operation, and if at least one of these positions corresponds to or exceeds the system-side limit position, the detection of the positions and/or trajectory is aborted. In particular, from the point in time at which at least one position corresponds to or exceeds the system-side limit position, the detection of the positions and/or trajectory is ended. This can, in turn, be acoustically and/or optically and/or haptically output to the user, such that the user is made aware that the vehicle-guidance system is not available for subsequent autonomous travel of the trajectory in the opposite maneuvering direction.

In this case, the user can, for example, be acoustically and/or optically notified that they should start a new attempt for manually performing the maneuvering operation. Therefore, the user can, for example, at least reset the vehicle somewhat, i.e., for example, drive counter to the maneuvering direction, such that renewed manual travel of the trajectory can be started and the functions are initially available again on the system side. This can, for example, be performed so many times until it can be established on the system side that autonomous travel is possible.

In some embodiments, it is provided that, during travel of the trajectory, surroundings of the vehicle are detected, in particular permanently or else continuously, by means of at least one detection unit of the vehicle, wherein at least one item of surroundings information relating to the detected surroundings is provided to the evaluation unit, and the at least one item of surroundings information is taken into account when determining the assessment result. Therefore, the assessment or else the determination of the assessment result can be performed more effectively or else better, since further surroundings information can also be taken into account in addition to the actual information relating to the travel of the trajectory. Here, for example, potential collision objects, road boundaries, road courses, road properties, other road users, obstacles, or other information relating to a traffic situation can be taken into account during the maneuvering operation. In particular, using the surroundings information, information relating to the parking space or else parking place can be taken into account, for example during a parking operation as the maneuvering operation. For example, a parking place orientation and/or parking place dimension can additionally be taken into account during determination of the assessment result. If, for example, it is established on the system side based on the surroundings information that difficulties may also occur on the system side for autonomous travel, this can, in turn, be taken into account during assessment or else determination of the assessment result and notified to the system and, in particular, the user. In particular, all-round detection of the surroundings of the vehicle may take place during travel of the trajectory. For this purpose, multiple sensors may be arranged on the vehicle as detection units.

A further example aspect relates to a method for operating a vehicle-guidance system of a vehicle, wherein movements of the vehicle are evaluated using a method according to the previous aspect or a development thereof, wherein, depending on the provided assessment result, at least one trajectory portion of the trajectory is traveled in the maneuvering direction opposite to the maneuvering by means of direction the vehicle autonomously guided by the vehicle-guidance system. Therefore, the embodiments with regard to the previous aspect can be used for the method just described. Therefore, in particular, the vehicle-guidance system can be operated particularly efficiently.

The assessment result may therefore, for example, be provided or else transmitted to the electronic vehicle-guidance system via communication connections. Accordingly, the electronic vehicle-guidance system may or may not activate an autonomous driving mode depending on the decision made based on the assessment result. Here, intermediate stages, such as at least semi-autonomous states, may still be implemented, for example.

In particular, the maneuvering operation may have been manually performed by the user of the vehicle as a parking operation into a parking space. Therefore, forward travel into a parking space was implemented as the maneuvering direction. Then, after the maneuvering operation, a temporally later autonomous pulling-out operation with respect to the parking operation can be performed by means of the vehicle-guidance system as the reverse maneuvering operation in an opposite maneuvering direction. Therefore, a pulling-out direction, in particular a reverse pulling-out direction from a parking place, is understood as the opposite maneuvering direction. This takes place with the aid of the vehicle-guidance system, in particular fully autonomously.

In some embodiments of the above-mentioned further aspect, it can be provided that a surrounding region of the vehicle is detected by means of at least one detection unit during autonomous travel of the at least one trajectory portion in the maneuvering direction opposite to the maneuvering direction, wherein the detected surrounding region is assessed by means of the vehicle-guidance system with regard to whether at least one potential collision object is located in the surrounding region, and the at least one potential collision object is taken into account during autonomous travel. In other words, it may, for example, be the case that potential collision objects were present in the surrounding region during manual execution of the trajectory during the maneuvering operation and, for example, are no longer present during the autonomous reverse maneuvering operation. Therefore, the previously identified or else detected collision objects no longer pose a danger during the autonomous travel of the at least one trajectory portion. Otherwise, it can also be established that the potential collision objects are still present in the surrounding region and these are to be particularly taken into account during the autonomous travel, such that no collisions occur with these collision objects. For example, the collision object may be another vehicle, a road user, a tree, a guardrail, a boundary post, a parking place boundary, a column, a high curb, a road boundary, or another travel lane. It can therefore, for example, be checked on the system side as to whether previously present obstacles or else collision objects are still present or not. In any case, these the system side when detecting are taken into account on potential collision objects for the autonomous travel. The surrounding region may be continuously monitored or else observed during the maneuvering operation and during the reverse maneuvering operation. Therefore, collisions between the vehicle and a potential collision object can be prevented or else avoided.

For example, the one detection unit may be environment sensors or else an environment sensor system of the vehicle.

In some embodiments of the further aspect, it is provided that the vehicle-guidance system or else the evaluation unit checks whether the at least one potential collision object is located at least in part along the at least one trajectory portion, and if yes, the autonomous travel is ended. If, in particular, it is already established during the started autonomous travel that a collision with the potential collision object is imminent and there is a danger, the autonomous travel can, in particular, be ended immediately and the user informed of this. In particular, it is then significant if the potential collision object is located either in part along the at least one trajectory portion or within the trajectory portion. If this is the case, it is possible to end the autonomous travel on the system side such that no danger can arise. In the process, it can, in particular, also be checked as to whether, for example, the collision object itself is moving along the trajectory and whether, for example, a speed reduction or else braking could prevent a potential danger from the collision object. In this case, the autonomous travel can, in turn, be continued in a different manner.

A further aspect relates to an electronic vehicle-guidance system having an evaluation unit, wherein the vehicle-guidance system is designed to carry out a method according to any one of the preceding aspects or a development thereof. Therefore, a method according to any one of the preceding aspects can be executed with the aid of the electronic vehicle-guidance system.

In particular, the electronic vehicle-guidance system may be an electronic assistance system of the vehicle. In particular, the vehicle can be controlled in an open-loop manner or else operated or else moved at least semi-autonomously, in particular fully autonomously, with the aid of the electronic vehicle-guidance system. In particular, the electronic vehicle-guidance system is a reversing assistant.

An electronic vehicle-guidance system can be understood to mean an electronic system which is configured to guide a vehicle fully automatically or fully autonomously, in particular when no intervention in open-loop control on the part of a driver is required. The vehicle performs all required functions, for example steering, braking and/or acceleration maneuvers, the observation and detection of road traffic as well as corresponding reactions, automatically. In particular, the electronic vehicle-guidance system may implement a fully automatic or fully autonomous driving mode of the motor vehicle according to Level 5 of the classification according to SAE J3016. An electronic vehicle-guidance system can be understood to mean a driver assistance system which supports the driver during partially automated or semi-autonomous driving. In particular, the electronic vehicle-guidance system can implement a partially automated or semi-autonomous driving mode according to Levels 1 to 4 of the SAE J3016 classification.

The at least partially automatic vehicle guidance may therefore include guiding the vehicle according to a fully automatic or fully autonomous driving mode of Level 5. The at least partially automatic vehicle guidance may also include guiding the vehicle according to a partially automated or semi-autonomous driving mode of Levels 1 to 4.

A further aspect relates to a vehicle having a vehicle-guidance system according to the previous aspect.

In particular, the vehicle may be a highly automated vehicle. In particular, the vehicle may be a vehicle that can be operated at least in a semi-autonomous manner and especially in a fully autonomous manner. In particular, the vehicle is a passenger car, a truck, or a motor vehicle.

In particular, the vehicle may comprise a trailer, and therefore the vehicle may, for example, be a vehicle-trailer combination.

Example embodiments or else embodiments of an aspect of the teachings herein are to be regarded as embodiments of the other aspects. This also applies vice versa.

Further embodiments of the electronic vehicle-guidance system and of the vehicle result directly from the various embodiments of the method and vice versa. In particular, individual features and corresponding explanations with regard to the various embodiments for the method apply analogously to corresponding embodiments of the electronic vehicle-guidance system and of the vehicle. In particular, the electronic vehicle-guidance system and the vehicle are designed or programmed to carry out one of the methods described herein. In particular, the electronic vehicle-guidance system or the vehicle carries out one of the methods described herein.

Also belonging to the disclosure are developments of the electronic vehicle-guidance system and of the vehicle that have features which have already been described in conjunction with the developments of the method. For this reason, the corresponding developments of the electronic vehicle-guidance system and of the vehicle are not described again to avoid a duplication.

Reference will now be made to the drawings in which the various elements of embodiments will be given numerical designations and in which further embodiments will be discussed.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

FIG. 1 shows, for example, a vehicle 1 which, for example, comprises an electronic vehicle-guidance system 2. With the aid of the vehicle-guidance system 2, it is possible, for example, to operate the vehicle 1 at least semi-autonomously, in particular fully autonomously, if needed.

For example, the vehicle 1 may currently be at a first location P1. Proceeding from this location P1, the vehicle 1 can, for example, be moved by a user 3 of the vehicle 1. The user 3 is, in particular, a vehicle driver or else a driver of the vehicle 1. The vehicle 1 can be manually moved or else controlled in an open-loop manner along a trajectory 4 or else a movement path or else a route course during a maneuvering operation 5. For example, the maneuvering operation 5 is a parking operation in the forward direction of the vehicle 1 into a parking space or else into a parking region. Said parking region may, in turn, be referred to as the second location P2. Therefore, a manual maneuvering operation or else parking operation into a parking space or else parking place 6 is performed. The trajectory 4 can be executed by the user 3 manually actuating a steering element 7 of the vehicle 1. The steering element 7 is, in particular, a steering wheel of the vehicle 1.

Therefore, in this case, a manual parking operation into the parking space 6 takes place first. A subsequent pulling-out operation, for example, can be autonomously performed with the aid of the vehicle-guidance system 2. Therefore, a reversing assistant is used here. For this purpose, positions of the steering element 7 can be detected or else recorded or else ascertained continuously and, in particular, automatically during travel of the trajectory 4 during the maneuvering operation 5. For example, the positions 8 to 10 may be a steering wheel angle, steering lock angle, steering lock state, or actuation position of the steering element 7 and, in particular, of the steering wheel. Said detected positions 8 to 10 may, for example, be provided to an evaluation unit 11 or else an electronic evaluation unit or computing unit. The evaluation unit 11 may, for example, be part of the electronic vehicle-guidance system 2. It is also conceivable for the evaluation unit 11 to be a unit that is separate from the vehicle-guidance system 2 and/or vehicle 1.

With the aid of the evaluation unit 11, the positions 8 to 10 can be compared or else analyzed with at least one specified reference position 12 or else with an item of reference information or else an item of comparative information. The reference position 12 may, in particular, be a value range or else interval or else interval range. This is particularly significant because a steering wheel can, for example, either be steered to the left or to the right. Therefore, a positive or negative angular range can, for example, be specified here in each case. The reference position 12 is determined, in particular influenced, depending on at least one system property of the vehicle-guidance system 2. This is because the vehicle-guidance system 2 is subject to system-side limits such as closed-loop control limits, open-loop control limits, closed-loop control properties. These must be taken into account accordingly, such that when the vehicle 1 is manually moved along the trajectory 4, situations or else states do not arise which can no longer be autonomously implemented accordingly at a later time by the vehicle-guidance system 2. Therefore, it must be ensured that the actuated positions by the user are not positions which exceed the system limits of the vehicle-guidance system 2.

Accordingly, the reference position 12 can be established such that it is within a range 13. With the range 13, it is for example established here that there is a range between a mechanical limit position of the steering element 7 with regard to manual actuation of the steering element 7 and a system-side limit position with regard to autonomous actuation of the steering element 7 by the vehicle-guidance system 2. Therefore, it can be achieved that, when the trajectory 4 is being traveled by the user 3 with the vehicle 1, no situations occur in which the vehicle-guidance system 2 is overwhelmed and, in particular, overburdened during later autonomous operation. This must be prevented.

For this purpose, the comparison is carried out on the system side between the positions 8 to 10 and the reference position 12. In the process, at least one exceedance event or else exceedance result is determined by the evaluation unit 11. The evaluation unit 11 is used to compare whether a position 8 to 10 is greater than or equal to the reference position 12. In other words, it is checked, for example, whether a current steering wheel angle or else steering lock angle of the steering element 7 is greater than or equal to a specified reference steering wheel lock angle. This comparison can, in turn, be performed in each individual position 8 to 10, such that each detected position is compared with the reference position 12 during travel of the trajectory 4. Based on the at least one exceedance result, in which at least one position 8 to 10 is greater than the reference position 12, an assessment result can be determined or else generated. In the process, an assessment takes place as to whether, on the basis of the assessment result, a potential option for autonomously traveling at least one trajectory portion 14 of the trajectory 4 in a maneuvering direction 15 opposite to the maneuvering direction 24 can be performed by means of the vehicle-guidance system 2. In other words, it is checked as to whether, after manual parking into the parking space 6, the vehicle-guidance system 2 can perform the pulling-out operation autonomously without dangers or critical situations arising.

Firstly, it can be assessed as to whether the entire trajectory 4 can be traveled again autonomously in reverse or whether autonomous travel is possible at least within the at least one trajectory portion 14. Equally, further portions of the trajectory 4 can be assessed. The provided assessment result can, for example, be provided to the vehicle-guidance system 2 by the evaluation unit 11 via communication technology connections or else options. For example, with the aid of the provided assessment result, the at least one trajectory portion 15 and/or the trajectory 4 can be traveled in the maneuvering direction 15 opposite or else counter to the maneuvering direction 24 autonomously by means of the vehicle-guidance system 2. Consequently, an autonomous pulling-out operation, in particular in the reverse direction, can be performed in consideration of the assessment result. The pulling out can therefore be facilitated for the user 2.

A permanent check of the positions 8 to 12 relative to the reference position 12 can be performed in order to teach or else support the user 3 as early as during the maneuvering operation 5 in such a way that the vehicle-guidance system 2 can perform the following or else subsequent pulling-out operation as the reverse maneuvering operation 25. In the process, at least one alert can be generated, in particular depending on the assessment result, wherein said alert can be output acoustically, optically, and/or haptically in the vehicle 1, for example by means of an output unit 16. In this regard, the user 3 can, for example, be informed that a critical position can be reached depending on the current actuation of the steering element 7. This would, for example, have effects on travel of the trajectory 4. In this regard, depending on the steering angle or else steering lock angle of the steering element 7, a deviation 17 to 20 with respect to the trajectory 4 may arise, and therefore the user 3 potentially steers in too far away from the road or a bend or a turn-off point. This, in turn, can be corrected with the aid of the alert, such that the user 3 can intervene in the steering behavior of the vehicle 1. For this purpose, further alerts can also be generated and the alerts can be output in a cascaded sequence depending on a value of the exceedance result or else a danger level or else a critical level with regard to the adopted positions 8 to 10. Therefore, depending on the current potential for danger or else the priority of the positions 8 to 10, in particular compared with the reference position 12, various alerts and/or hints and/or warning signals can be output to the user 3, such that said user is warned of a range approaching a critical system limit for the vehicle-guidance system 2 beforehand. Consequently, countermeasures, in particular counter-steering measures, can be implemented by the user 3 at an early stage, such that the positions of the steering element 7 and, in particular, the steering wheel are not dangerously excessive within the reference position 12. Therefore, recommendations for action and/or instructions and/or steering tips can, in turn, be made available and thus output to the user 3 with the aid of the alerts. The user 3 can use these to adjust or else correct or else change the actuation of the steering element 7 and thus adopt the positions 8 to 10. This can, in turn, be suggested to the user 3 with the aid of the alerts. If the user 3 does not take these into account, in the worst case scenario this may lead to autonomous travel in the opposite direction 15 by means of the vehicle-guidance system 2 being impossible. In particular, for example depending on the assessment result, suggestions can be made to the user 3 such that the positions 8 to 10 of the steering element 7 can be changed such that they are less than or equal to the reference position 12. This is beneficial for later autonomous operation of the vehicle 1.

Another option in addition to acoustically and/or optically warning the user 3 of a critical position 8 to 10 may be haptic feedback on the actuation element 7. Here, for example depending on the at least one exceedance result, a steering property of the steering element 7 can be adjusted for manual actuation. For example, when a critical position is reached, a haptic pulse or else haptic feedback can be output via the actuation element 7, which is being gripped by at least one hand of the user 3. Therefore, the user 3 learns via haptic feedback that the steering wheel lock or else steering wheel angle is critical and that they should counteract accordingly or else steer counter or else back somewhat.

Furthermore, a relevant difference between the detected positions 8 to 10 and the system-side limit position with respect to autonomous actuation of the steering element 7 can be ascertained or else determined with the aid of the evaluation unit 11. It can therefore be established, for example, to what extent the relevant position deviates from the limit position. If the difference assumes a critical value, in particular if the difference approaches 0, this can be taken into account when determining the assessment result and used accordingly for deciding on an autonomous driving mode.

In particular, the ascertained difference can, for example, be provided or else transmitted to the vehicle-guidance system 2. Therefore, the vehicle-guidance system 2 itself can establish if the difference exceeds s a first specified threshold value. In this case, a first safety mechanism from a number of different safety mechanisms of the vehicle-guidance system 2 can be activated. In this first safety mechanism, autonomous travel by means of the vehicle-guidance system 2 is only possible to a limited extent or else with conditions. If it is in turn established that the difference exceeds a second specified threshold value, a second safety mechanism of the vehicle-guidance system 2 that is different from the first safety mechanism can be activated. In this second safety mechanism, autonomous travel and thus autonomous operation of the vehicle 1 can be prevented or else blocked or else forbidden on the system side. This may be the case until it is in turn established on the system side that there is a safe mode for the vehicle-guidance system 2.

Furthermore, it can be established, for example, on the system side if at least one of the detected positions 8 to 10 corresponds to or exceeds the system-side limit position. If this is established, and therefore the user 3 performs actuations with the steering element 7 that cannot be replicated or else recreated for autonomous driving on the system side by the vehicle-guidance system 2, the detection of the positions 8 to 10 can be aborted when the trajectory 4 is traveled and/or complete detection of the trajectory 4 itself can be aborted when the trajectory 4 is traveled. Therefore, autonomously pulling out is not available in this case.

In order that, in particular, the assessment as to whether autonomous travel in the opposite direction 15 is possible can be performed better, additional information can be recorded or else provided. Here, surroundings 23 of the vehicle 1 can be permanently detected using at least one detection unit 22, for example during travel of the trajectory 4. The detection unit 22 may, for example, be an environment detection system of the vehicle 1 or multiple sensors arranged distributed on the vehicle 1. In the process, by means of the detection, at least one item of surroundings information relating the to surroundings 23 can be made available to the evaluation unit 11 and, in particular, to the vehicle-guidance system 2. This can also be taken into account, above all, when determining the assessment result, since dangerous bends, road courses, traffic situations can potentially play a role here.

For example, during detection of the surroundings 23 during the maneuvering operation 5 and also during the reverse maneuvering operation in the first maneuvering direction 15, i.e. when pulling out, the surroundings and, in particular, a surrounding region of the vehicle 1 are assessed or else checked as to whether at least one potential collision object 21 is located in the surroundings 23. If this is the case, this must be taken into account for autonomous travel. A collision object 21 of this kind may, for example, be road boundaries, other road users, advertising columns, or other dangerous objects in the region of the trajectory 4. Here, it is above all checked on the system side whether a collision object 21 of this kind is located in part along the trajectory 4 or trajectory portion 14. In particular, it is checked whether a collision object 21 is located on the trajectory 4 or, for example, next to it, i.e. next to a road. If, during or before the planned autonomous travel, it is established that a collision with a collision object 21 is probable, the autonomous travel can either not be started or else released at all or, in the case that it has already begun, be ended immediately. In particular, the detection of the trajectory 4 during manual travel can be used to create and generate a reference trajectory or else training trajectory, which can be used for machine training of the vehicle-guidance system 2, for example for autonomous pulling-out operations. Another option is to share the detected positions, trajectories, and in particular the determined assessment result with other vehicles, in particular a vehicle fleet, such that these other vehicles can also use the information for maneuvering operations and, in particular, reverse maneuvering operations.

For example, the information relating to the exemplary embodiment shown in FIG. 1 relation to the maneuvering operation 5 from the location P1 to the location P2, i.e. manual, and in turn from the location P2 to the location P1, which is performed autonomously, can be stored in a digital map, such that vehicles that undertake a similar operation between the locations P1 and P2 and vice versa can take this information into account as historical information. Therefore, a manual driving operation takes place, for example, from the location P1 to the location P2 and an autonomous driving operation takes place from the location P2 to the location P1.

For example, a specified difference can be established between limit position and the system-side limit the mechanical position. For example, if the positions are steering wheel lock angles, a difference between the system-side and mechanical limit position may be 5 degrees, in particular 10 degrees, at most 15 degrees. Therefore, the system-side limit position has a lower maximum steering lock angle of the steering wheel.

In other words, an improved reversing assist can be made available for vehicles with the aid of the teachings herein. During teaching of the trajectory 4, the driver or else user 3 can be instructed to drive a trajectory that is not too sharp, for example the deviations 17 to 20, such that these can be followed again on the system side, in particular autonomously. Here, when a defined steering wheel angle is exceeded when the user 3 is traveling the trajectory 4, haptic feedback and/or a brief limitation and/or a brief steering pulse and/or a gentle stop on the steering wheel can take place, such that the user 3 feels or else perceives the limits for the autonomous driving mode. For example, a sort of "counter-torque" or counter-steering measure may be implemented here, such that this can be perceived by the user when the user 3 is steering.

Figure 2:
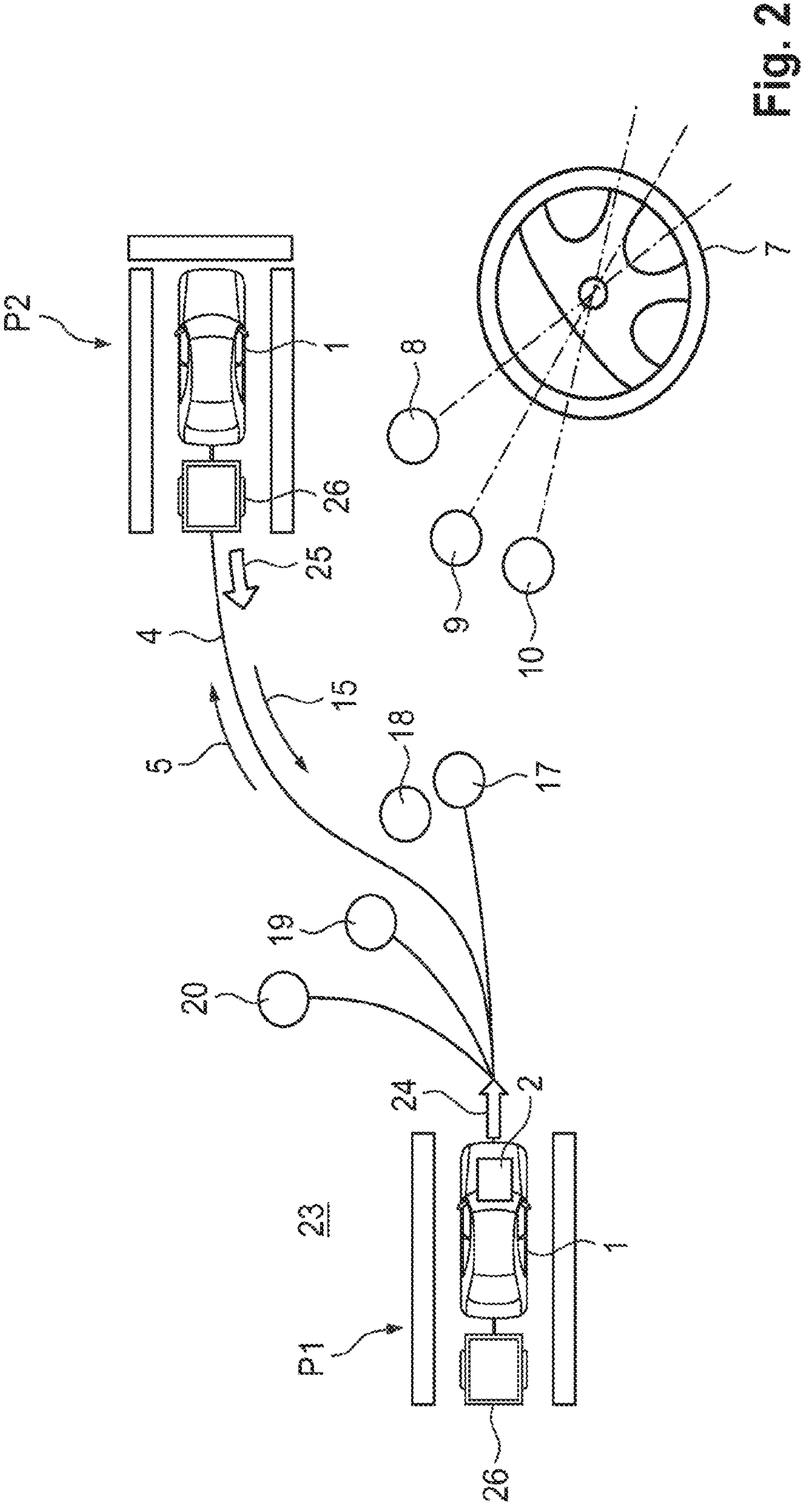
FIG. 2 is another schematic representation of a vehicle with a trailer and comprising an example electronic vehicle-guidance system during travel of a trajectory.

With regard to the comments from FIG. 1, FIG. 2 shows the case where the vehicle additionally comprises a trailer 26. Therefore, the vehicle 1 is designed here as a vehicle-trailer combination. In this regard, reference can be made entirely to the comments made regarding FIG. 1. The comments there also apply here.

In addition, a kind and/or geometry and/or dimension and/or loading and/or type of the trailer 26 can be taken into account for assessing or else determining the assessment result.

By way of example, the present disclosure is now explained in different terms. For example, the user 3 may steer the vehicle 1. Here, the position 8 may, for example, be a neutral position. When the steering wheel angle exceeds the reference position 12, haptic feedback and/or a brief limitation and/or a steering pulse takes place on the steering wheel, such that the user 3 feels the limit and does not steer in any further. The hint may be temporary or a long-lasting gentle steering stop that is before the actual mechanical steering lock. As a result, the user can intuitively learn the limits without a separate HMI being required for this. At the same time, a message can be shown to the user 3 that the subsequent reproducing reverse travel is no longer possible if they steer beyond the steering stop. This message may also be provided with the hint for the feedback option for the user 3, that the message was understood and does not need to be displayed anymore. The driver can deliberately steer beyond the gentle steering stop in order, for example, to drive tight bend radii. Consequently, however, they cannot utilize the closed-loop from control the saved trajectory, and therefore autonomous driving is not possible.

This can be signaled to the user 3 using simple and clear alerts.

LIST OF REFERENCE NUMERALS

1 Vehicle
2 Electronic vehicle-guidance system
3 User
4 Trajectory
5 Maneuvering operation
6 Parking place
7 Steering element
8, 9, 10 Positions
11 Evaluation unit
12 Reference position
13 Range
14 Trajectory portion
15 Opposite maneuvering direction
16 Output unit
17 to 20 Deviations from the trajectory
21 Collision objects
22 Detection unit
23 Surroundings
24 Maneuvering direction
25 Reverse maneuvering operation
26 Trailer
P1, P2 First and second location The invention has been described in the preceding using various example embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The terms "in particular" and "particularly" used the specification means "for example" or "for throughout instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for evaluating movements of a vehicle, comprising:

moving the vehicle along a trajectory in a maneuvering operation of the vehicle, wherein the trajectory is traveled by manual actuation of a steering element of the vehicle by a user;

detecting positions of the steering element when traveling the trajectory;

comparing the positions with at least one specified reference position of the steering element and determining at least one exceedance result using an evaluation circuit, in which a position is greater than or equal to the reference position;

determining an assessment result using the evaluation circuit at least on the basis of the at least one exceedance result, wherein a potential option for autonomously traveling at least one trajectory portion of the trajectory in a maneuvering direction opposite to the maneuvering direction is assessed using the assessment result;

providing the assessment result to a vehicle-guidance system of the vehicle.

2. The method of claim 1, comprising generating at least one alert depending on the provided assessment result, wherein the at least one alert is output acoustically, optically, and/or haptically in the vehicle.

3. The method of claim 2, comprising generating further alerts in addition to the at least one alert depending on a value of the exceedance result, wherein the at least one alert and the further alerts are output in a cascaded sequence in the vehicle.

4. The method of claim 2, comprising outputting a recommendation for action to the user with the at least one alert, which recommendation for action proposes adjusting the manual actuation of the steering element to the user, in particular an actuation with a view to changing the position of the steering element to less than or equal to the reference position is proposed.

5. The method of claim 1, comprising adjusting a steering property of the steering element for the manual actuation of the steering element depending on the at least one exceedance result, as a result of which the user experiences haptic feedback in relation to the at least one exceedance result during manual actuation of the steering element.

6. The method of claim 1, wherein the reference position is determined depending on at least one system property of the vehicle-guidance system, wherein the reference position is determined such that it is in a range between a mechanical limit position of the steering element with regard to a manual actuation of the steering element and a system-side limit position with regard to an autonomous actuation of the steering element by the vehicle-guidance system.

7. The method of claim 6, wherein a relevant difference between the detected positions and the system-side limit position is ascertained, wherein the relevant difference is taken into account when determining the assessment result.

8. The method of claim 7, wherein, if the difference exceeds a first specified threshold value, a first safety mechanism of the vehicle-guidance system, in which autonomous travel of the at least one trajectory portion of the trajectory in the maneuvering direction opposite to the maneuvering direction can be performed to a limited extent, is activated, and if the difference exceeds a second specified threshold value, a second safety mechanism of the vehicle-guidance system, in which autonomous travel of the at least one trajectory portion of the trajectory in the maneuvering direction opposite to the maneuvering direction cannot be performed, is activated.

9. The method of claim 6, wherein, if at least one of the detected positions corresponds to or exceeds the system-side limit position, the detection of the positions of the steering element during travel of the trajectory and/or detection of the trajectory during travel of the trajectory is aborted.

10. The method of claim 1, wherein, during travel of the trajectory, surroundings of the vehicle are detected using at least one detection circuit of the vehicle, wherein at least one item of surroundings information relating to the detected surroundings is provided to the evaluation circuit, and the at least one item of surroundings information is taken into account when determining the assessment result.

11. A method for operating a vehicle-guidance system of a vehicle, wherein movements of the vehicle are evaluated using the method of claim 1, wherein, depending on the provided assessment result, at least one trajectory portion of the trajectory is traveled in the maneuvering direction opposite to the maneuvering direction using the vehicle autonomously guided by the vehicle-guidance system.

12. The method of claim 11, wherein a surrounding region of the vehicle is detected using at least one detection circuit during autonomous travel of the at least one trajectory portion in the maneuvering direction opposite to the maneuvering direction, wherein the detected surrounding region is assessed using the vehicle-guidance system with regard to whether at least one potential collision object is located in the surrounding region, and the at least one potential collision object is taken into account during autonomous travel.

13. The method of claim 12, wherein the vehicle-guidance system checks whether the at least one potential collision object is located at least in part along the at least one trajectory portion, and if yes, the autonomous travel is ended.

14. An electronic vehicle-guidance system having an evaluation circuit, wherein the vehicle-guidance system is configured to:

move the vehicle along a trajectory in a maneuvering operation of the vehicle, wherein the trajectory is traveled by manual actuation of a steering element of the vehicle by a user;

detect positions of the steering element when traveling the trajectory;

compare the positions with at least one specified reference position of the steering element and determining at least one exceedance result using the evaluation circuit, in which a position is greater than or equal to the reference position;

determine an assessment result using the evaluation circuit at least on the basis of the at least one exceedance result, wherein a potential option for autonomously traveling at least one trajectory portion of the trajectory in a maneuvering direction opposite to the maneuvering direction is assessed using the assessment result; and provide the assessment result to a vehicle-guidance system of the vehicle.

15. A vehicle having a vehicle-guidance system of claim 14.

16. The electronic vehicle-guidance system of claim 14, wherein the vehicle-guidance system is configured to generate at least one alert depending on the provided assessment result, wherein the at least one alert is output acoustically, optically, and/or haptically in the vehicle.

17. The electronic vehicle-guidance system of claim 14, wherein the vehicle-guidance system is configured to generate further alerts in addition to the at least one alert depending on a value of the exceedance result, wherein the at least one alert and the further alerts are output in a cascaded sequence in the vehicle.

18. The electronic vehicle-guidance system of claim 14, wherein the vehicle-guidance system is configured to output a recommendation for action to the user with the at least one alert, which recommendation for action proposes adjusting the manual actuation of the steering element to the user, in particular an actuation with a view to changing the position of the steering element to less than or equal to the reference position is proposed.

19. The electronic vehicle-guidance system of claim 14, wherein the vehicle-guidance system is configured to adjust a steering property of the steering element for the manual actuation of the steering element depending on the at least one exceedance result, as a result of which the user experiences haptic feedback in relation to the at least one exceedance result during manual actuation of the steering element.

20. The electronic vehicle-guidance system of claim 14, wherein the vehicle-guidance system is configured to determine the reference position depending on at least one system property of the vehicle-guidance system, wherein the reference position is determined such that it is in a range between a mechanical limit position of the steering element with regard to a manual actuation of the steering element and a system-side limit position with regard to an autonomous actuation of the steering element by the vehicle-guidance system.

* * * * *